United States Patent [19]

Pierre

[11] E Re. 29,294

[45] Reissued July 5, 1977

[54] PRESS FOR MOULDING GRAMOPHONE RECORDS OR THE LIKE

[75] Inventor: Marcel J. Pierre, Cheptainville, France

[73] Assignee: Societe Materiel pour Toutes Applications Plastiques - M.A.P., Paris, France

[22] Filed: Nov. 18, 1976

[21] Appl. No.: 743,033

Related U.S. Patent Documents

Reissue of:

[64] Patent No.: 3,969,057
Issued: July 13, 1976
Appl. No.: 548,752
Filed: Feb. 10, 1975

[30] Foreign Application Priority Data

Feb. 21, 1974 France ..... 74.05980

[52] U.S. Cl. ..... 425/590; 425/4 R; 425/810

[51] Int. Cl.² ..... B29F 1/00; B29H 3/08

[58] Field of Search ... 425/4 R, 138, 150, DIG. 223, 425/242 R, 244, 451.2, 810; 164/312, 313, 314, 322, 341, 343, 100/295

[56] References Cited

UNITED STATES PATENTS

| | | | |
|---|---|---|---|
| 3,346,924 | 10/1967 | Lombard | 425/242 X |
| 3,765,812 | 10/1973 | Sugiyama | 425/242 R X |

FOREIGN PATENTS OR APPLICATIONS

| | | | |
|---|---|---|---|
| 1,245,105 | 7/1967 | Germany | 425/4 R |
| 47-27,271 | 10/1972 | Japan | 425/4 R |
| 1,193,405 | 6/1970 | United Kingdom | 425/242 R |
| 967,211 | 8/1964 | United Kingdom | 425/4 R |

*Primary Examiner*—Francis S. Husar
*Assistant Examiner*—John S. Brown
*Attorney, Agent, or Firm*—Larson, Taylor and Hinds

[57] ABSTRACT

A press for moulding plastic materials for the manufacture of gramophone disc records or like flat parts comprises a fixed press platen carrying a first mould element, a movable press platen guided along columns fast with the fixed platen and a movable intermediate platen carrying a second mould element. A mechanical device is provided to urge the movable press platen to the fixed press platen. A fluid pressure is supplied between coacting cylinder and piston provided respectively in the movable platens. The intermediate platen is supported and guided by the movable platen without any contact between this intermediate platen and the columns.

4 Claims, 4 Drawing Figures

PRESS FOR MOULDING GRAMOPHONE RECORDS OR THE LIKE

Matter enclosed in heavy brackets [ ] appears in the original patent but forms no part of this reissue specification; matter printed in italics indicates the additions made by reissue.

BACKGROUND OF THE INVENTION

The invention relates to presses for moulding plastics materials. More particularly the invention relates to such presses suitably but not exclusively for the manufacture of flat parts such as gramophone disc records. Presses for moulding plastics materials are known which comprise: a fixed press platen adapted to carry a first mould element, a movable press platen guided by parallel columns fast with the fixed press platen; a movable intermediate platen adapted to carry a second mould element; means capable of moving the movable press platen along the guide columns, between an operative position close to the fixed press platen and an inoperative position remote from the fixed press platen; a circuit for the admission of fluid under pressure into a chamber defined by a piston, formed by one of the movable platens, in a cylinder formed by the other of the movable platens; and a feed system for plastics material in the fluid state capable of introducing under pressure a given volume or metered amount of this plastics material in the fluid state between the two mould elements when the movable press platen occupies its operative position and when the aforesaid circuit delivers fluid under pressure into the aforesaid chamber. By feed system there is understood in particular injection systems (with plunger), intrusion systems (with rotary feed screw) and the like.

In the known moulding presses of the kind hereinbefore defined, the intermediate platen is guided by the columns and this complicates the machining of the movable platens and subjects the columns to bending stresses.

The invention has the object in particular of remedying these disadvantages.

In a moulding press according to the invention the movable platen and the intermediate platen cooperate one within the other as an arrangement of a piston in a cylinder with the intermediate platen supported primarily or wholly by the movable press platen. This considerably simplifies machining of the movable platens and relieves the columns of bending stresses, thus enabling these columns to have a lighter construction.

Moreover, in some known presses of this kind, the movable press platen and the intermediate platen are first brought up to the fixed press platen together so that a gap subsists between the two mould elements. Then the feed or injection system introduces the metered amount or charge of plastics material into the mould, which is partly open at the time by reason of the gap in question. Finally, the intermediate platen is shifted by a jack bearing on the movable press platen and which is then maintained in a fixed position, so as to apply the two mould elements one against the other and thus compress the charge of plastics material inside the mould.

These known presses have a certain number of drawbacks. In particular, the charge of plastics material is distributed badly in the partly open mould, in particular when the injected material is very fluid and more particularly still when a horizontal press is concerned, that is to say a press in which the plane of the joint between the mould elements is vertical. Moreover, the gases occluded in the injected material are liberated under conditions such that traces of bubbles or blisters may be left at the surface of the moulded parts, which is very specially inconvenient when it is a guestion of manufacturing gramophone discs, for which the state of the surface must comply with extremely rigorous conditions.

SUMMARY OF INVENTION

Accordingly, the object of the invention is to render these presses such that they eliminate or reduce the disadvantages of the known presses.

To this end, the moulding press according to the invention is moreover characterised by the fact that the said means for moving the movable platen and the circuit for the admission of fluid under pressure are arranged to act, on each operation of introduction of plastics material under pressure, in two successive stages, the first of which consists in driving the intermediate platen towards the fixed platen with a resilient force calibrated to a value lower than the opposing force which is produced by the introduction of the plastics material into the mould and which tends to separate the two elements thereof, and the second of which is a stage of compression with a force sufficient to apply the two mould elements one against the other after introduction of the charge of plastics material.

In this way, the introduction or injection commences with the mould closed and continues, by reason of the resistance to flow offered by the already injected material, with progressive part opening of the mould, which forms a cake the thickness of which is greater than that of the part to be moulded, but the area of which only partially covers that of the impression of the mould. The injection being completed, the cake is flattened during the compression stage so that the injected material comes to occupy the entire volume of the impression of the mould. The liberation of the gases takes place under practically speaking constant compression of the material, that is to say under conditions which ensure that the moulded part has a flawless surface state. It is to be noted that the moulding press according to the invention utilizes the essential elements (press platens and intermediate platen) of a conventional press, which enables the invention to be carried into effect by not very costly modification of such conventional press already in service or to be built.

An embodiment of the invention will be explained, by way of example, in greater detail with the aid of the following additional description and of the accompanying drawings.

DESCRIPTION OF A PREFERRED EMBODIMENT OF THE INVENTION

Figure 1:
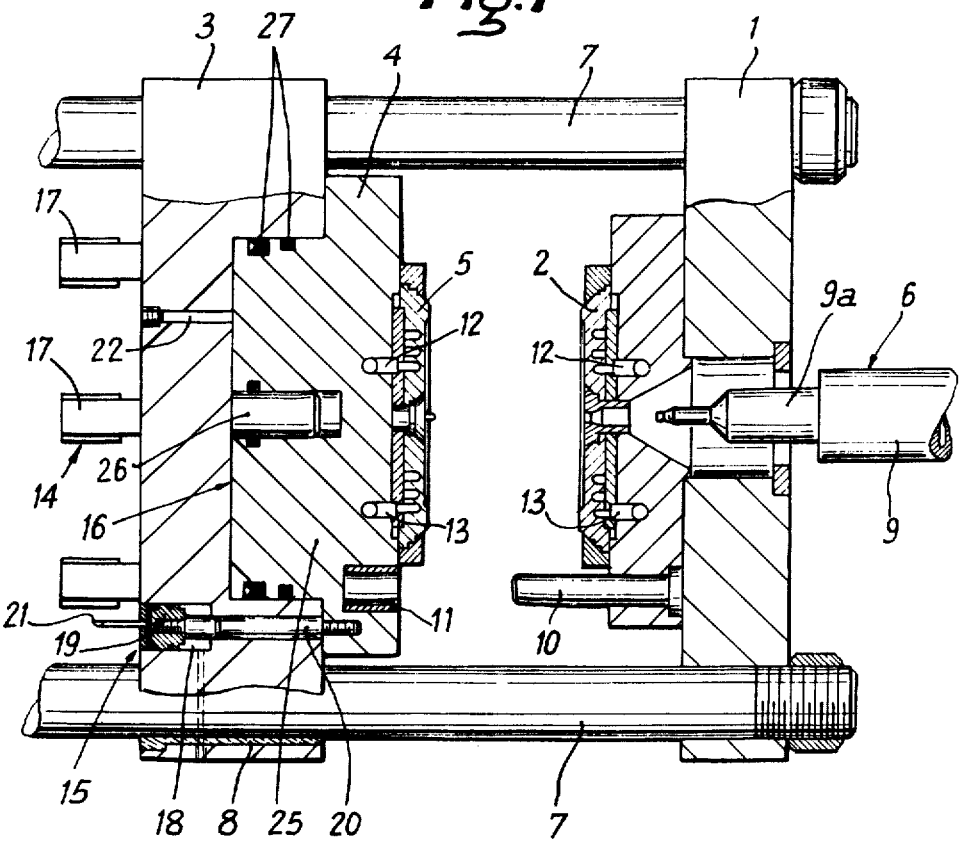
FIGS. 1, 2, 3 and 4 show, in diagrammatic axial section, a moulding press constructed in accordance with the invention in four successive working positions.

The press comprises a fixed press platen 1 fast with the press frame (not shown) and adapted to carry a first mould element 2, a movable press platen 3 guided with respect to the fixed press platen 1, a movable intermediate platen 4 adapted to carry a second mould element 5, and means adapted to shift the movable press platen 3 and the intermediate platen 4 so as to form the injection mould by bringing its two elements 2 and 5 together and to permit an injection system 6 to introduce therein a charge of plastics material in the fluid state and then compress this charge in the impression (or hollow space) of the mould.

Generally speaking, the press platens 1 and 3 are of approximately square shape and, in the vicinity of each of its corners, the fixed press platen 1 carries rigidly a guide column 7 on which a self-lubricating sleeve 8 carried by the movable press platen 3 at each of its corners can slide. The injection system 6 may be arranged, as shown, to extend through the base of the mould element 2, by bringing up its plasticizing cylinder 9 and its injection nozzle 9a parallel to the guide columns 7 (which bringing-up is apparent from a comparison between FIGS. 1 and 2). According to a variant (not shown), the system 6 may also be arranged to act in the plane of the joint between the two mould elements 2 and 5. Of course, the press comprises conventional devices for securing these elements to the platens 1 and 4, for mutually centering these platens and the said elements and regulating their temperature by circulation of water or other fluid, for controlling and centering the injection system, etc. These devices being known, it does not appear to be necessary to describe them in detail. By way of indication, however, a guide pillar 10 fast with the fixed press platen 1, and a guide sleeve 11 carried by the intermediate platen 4 and designed to receive the pillar 10 are shown, it being possible for two such pillars to be mounted along the diagonals of the platens. Also shown is a circuit for cooling liquid with an inlet 12 and an outlet 13 in each of the mould elements 2 and 5 (see FIG. 1).

For shifting the movable platens 3 and 4, the press includes means arranged to act, on each injection operation, in two successive stages, the first of which consists in driving the intermediate platen 4 towards the fixed platen 1 with a resilient force calibrated to a value below the opposing force which is produced by the injection of the plastics material into the mould and which tends to separate the two elements 2 and 5 thereof, and the second of which is a stage of compression with a force sufficient to apply these two elements one against the other after intervention of the injection system 6.

According to the embodiment illustrated, the aforesaid means are constituted by the combination of:

a. a mechanism 14 adapted to move the movable press platen 3 towards, and away from, the fixed press platen 1 with a generally constant stroke;

b. a resilient device 15 interposed between the movable press platen 3 and the intermediate platen 4 and adapted to create the said resilient force by yielding after, in the course of its stroke of approach (towards the left of the drawings), the intermediate platen 4, which is carried along at first by the movable press platen 3, has stopped by contact of the mould elements 2 and 5; and c. a device forming a jack or the like 16 between the movable press platen 3 and the intermediate platen 4 and adapted to exert on the latter the compressive force corresponding to the second stage of operation.

The mechanism 14 may be a constant-stroke closing assembly of the toggle type of which only the couplings 17 are shown diagrammatically.

The resilient device 15 is preferably constituted by at least one pneumatic jack, the cylinder 18 of which may be arranged in the movable press platen 3 and receives a piston 19 which is coupled by a rod 20 to the intermediate platen 4, the cylinder 18 being supplied with compressed air or other gas through the medium of a flexible pipe 21 and a suitable valve. It is the compressibility of this air or gas which ensures the necessary resilience of the device 15. Preferably, such a device is provided at two opposite corners of the platens 3 and 4.

According to a first variant, not a gas, but a liquid, could be made to act on the piston 19, provided that a pneumatic accumulator of the type used, for example, in oleopneumatic suspensions for vehicles is attached to the pipe 21. According to a second variant, the resilient device 15 may be formed by a metal spring (for example, a spiral spring or a stack of Belleville rings) which, if the elements 18 and 20 are retained, could be placed between the piston 19 and the end of the cylinder 18 remote from the rod 20.

Finally, the device forming a jack 16 is produced by arranging one of the platens 3 and 4 as a piston and the other as a cylinder at their facing portions, and by providing an inlet 22 for fluid under pressure, preferably liquid, into the chamber 23 defined by the piston in the cylinder in question. As shown, it is preferable that it be the movable press platen 3 that comprises the cylinder 24 and the intermediate platen 4 that comprises the piston 25 of the jack, the inlet 22 for fluid under pressure terminating in the platen 3. In this case, above all, the surfaces of contact between the cylinder 24 of the platen 3 and the piston 25 of the platen 4, aided if necessary by a central guide 26 between these two platens, are sufficient to ensure the guiding of the intermediate platen 4 without, consequently, having to provide direct contact between the platen 4 and the columns 7 of the press. Of course, it is necessary to provide packing rings such as 27 between the piston 25 and the cylinder 24.

Although the platen 3 has been shown in one piece with the walls of the cylinder 24, it could be advantageous, in particular for modifying a press of existing type or for facilitating machining operations, to make the platen 3 in two parts, namely, a practically speaking plane part (defined by the bottom surface of the cylinder 24) and a part in the form of a ring added to the first-mentioned part and comprising the side wall of the cylinder 24.

Figure 2:
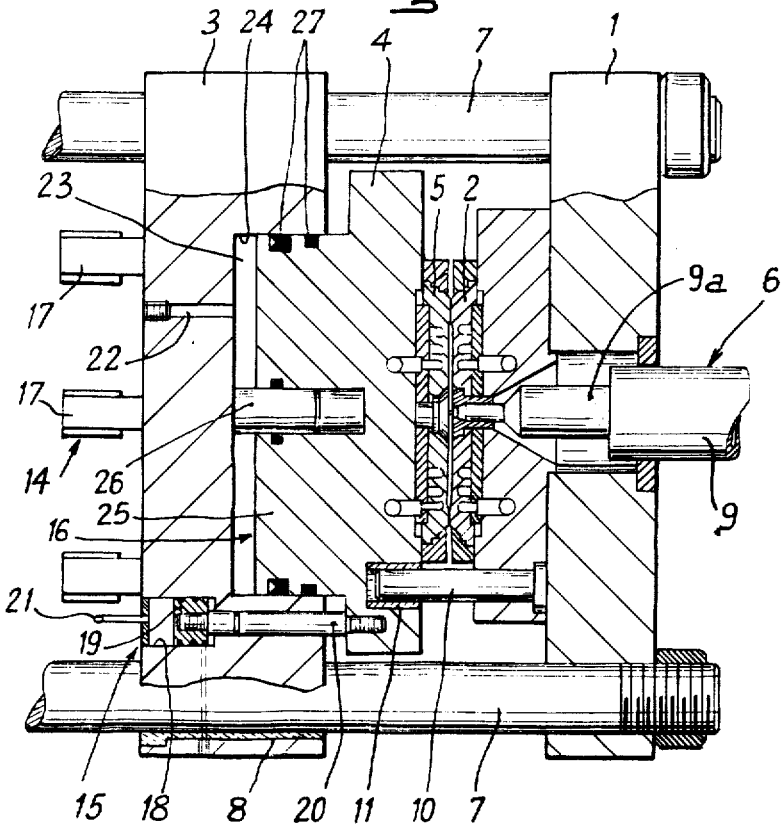
Figure 3:
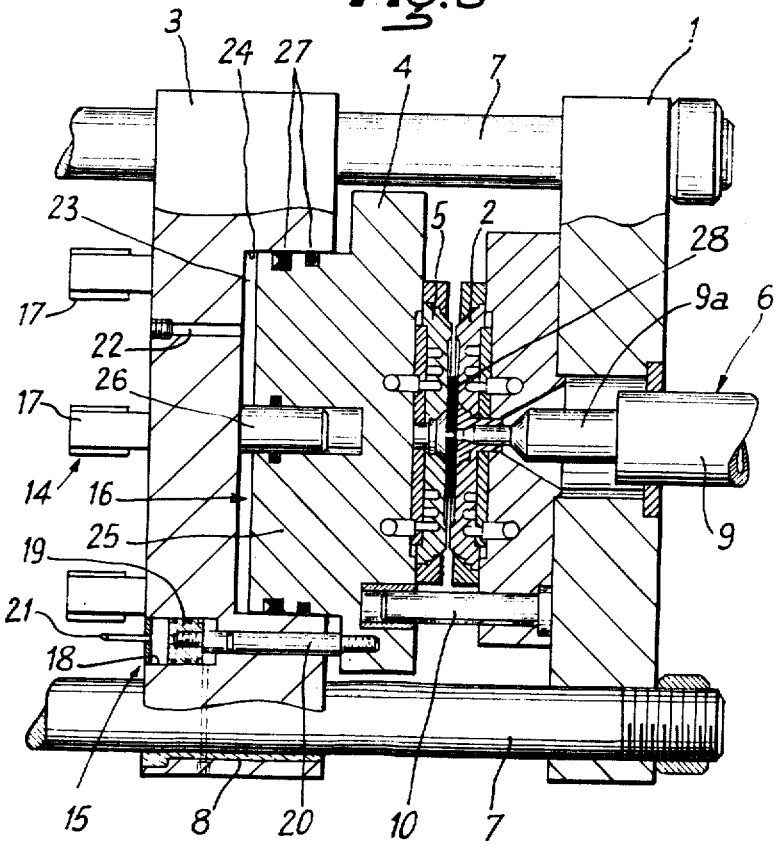
Figure 4:
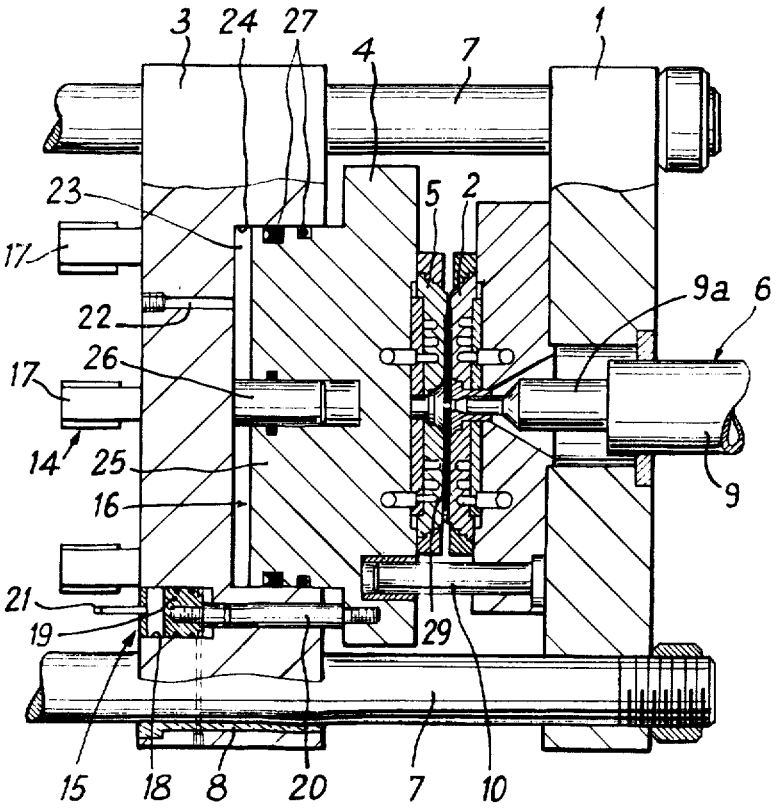

In this way, there is obtained a press the operation of which is as follows. FIG. 1 illustrates the starting position, in which the two platens 3 and 4 are separated to the maximum extent from the platen 1; the two mould elements 2 and 5 (which are empty) are also separated to the maximum extent and the injection system 6 is in the retracted position. In the first stage of an injection operation, the movable press platen 3 is brought up to the fixed press platen 1 to the maximum by the mechanism 14 and carries the platen 4 along with it. At the end of this bringing-up or approach stroke, there is an axial clearance between the intermediate platen 4 and the bottom of the cylinder 24, this clearance being smaller than the maximum stroke of each piston 19 in its cylinder 18. At some instant in the shifting of the platen 3, preferably at the end thereof, gas under pressure is admitted into the cylinders 18, so that the intermediate platen 4 is driven towards the fixed press platen 1 until the mould elements 2 and 5 come into contact at their edges, defining the mould impression cavity between them. Moreover, the injection system 6 is placed in the operating position. The pressure of the gas introduced into the cylinders 18 is determined, as a function of the total cross-section of these cylinders, the injection pressure, the nature of the injected material and the area of the impression of the mould, so that the pistons 19 may exert on the platen 4 a resilient force (due to the compressibility of the gas) calibrated to a value lower than the opposing force which will be created by the injection of the plastics material by the system 6. FIGS. 2 and 3 show the position of the parts of the press respectively before and after injection into the mould. By comparing these two Figures, it will be found that the injected material forms a cake 28 the thickness of which is greater than that of the impression of the mould, which means that the mould element 5 and the platen 4 carrying it have receded slightly, compressing the gas confined in the cylinders 18 and the pipes 21 by the valve (not shown) associated with them. The platen 3 remains fixed in position.

Finally, liquid under pressure is introduced into the chamber 23 and drives the platen 4 back again, but this time with a force sufficient to flatten the cake 28 until the elements 2 and 5 resume contact with each other. In this way there is obtained a moulded part 29 having exactly in solid form the dimensions of the empty mould and a flawless surface state.

In order to determine the sequence of the various operations (supply of the various jacks, circulation of the cooling liquid, advance, triggering and backward movement of the injection system 6, return to the starting position, removal of the moulded part, etc.), experts will have no difficulty in perfecting a suitable apparatus, making only a few relatively unimportant modifications in the controls of conventional moulding presses.

In any case, the moulding press according to the invention enables both flat parts (such as gramophone discs) and parts of considerable thickness to be obtained, the latter being able to receive inserts at the time of moulding or to be machined afterwards.

I claim:

1. Press for moulding gramophone disc records, comprising: a fixed press platen adapted to carry a first mould element; parallel guide columns fast with the fixed press platen; a movable press platen mounted on and movable relatively to said columns, a movable intermediate platen adapted to carry a second mould element, said first and second mould elements having cavities which together form the shape of a gramophone disc record, the movable press and intermediate platens co-operating one within the other as an arrangement of a piston in a cylinder with the intermediate platen supported wholly by the movable press platen; means including a constant-stroke closing mechanism of the toggle type for moving the movable press platen along the guide columns, between an operative position close to the fixed press platen and an inoperative position remote from the fixed press platen; a circuit for the admission of fluid under pressure between the movable press and intermediate platens to effect relative movement of the piston of said piston and cylinder arrangement out of its cylinder, and a feed system for plastics material in the fluid state capable of introducing under pressure a metered charge of this plastics material between the two mould elements when the movable press platen occupies its operative position and when the said circuit delivers fluid under pressure as aforesaid between the movable press and intermediate platens, said means for moving the movable press platen and the circuit for the admission of fluid under pressure being operable, after the movable platen has been moved toward the fixed platen by the constant stroke mechanism, to act upon the intermediate platen, on each operation of introduction of plastics material under pressure, in two successive stages, the first of which consists in driving the intermediate platen towards the fixed platen with a resilient force calibrated to a value lower than the opposing force which is produced by the introduction of the plastics material into the mould and which tends to separate the mould elements of the fixed and intermediate platens, and the second of which is a stage of compression with a force sufficient to move the two mould elements one against the other after introduction of the charge of plastics material.

2. Moulding press according to claim 1, wherein the movable press platen comprises the cylinder and the intermediate platen comprises the piston of the piston and cylinder arrangement, the circuit for the admission of fluid under pressure terminating in the movable press platen.

3. Moulding press according to claim 1, wherein a resilient device is interposed between the movable press platen and the intermediate platen to create the aforesaid resilient force by yielding after the intermediate platen, which is carried along at first by the movable press platen in its movement from its inoperative position to its operative position, has stopped by mutual contact of the mould elements of the intermediate and fixed platens, the circuit for the admission of fluid under pressure then operating to exert on the intermediate platen the compressive force corresponding to the aforesaid second stage.

4. Moulding press according to claim 3, wherein the resilient device interposed between the movable press platen and the intermediate platen is formed by at least one pneumatic jack.

* * * * *